BEST AVAILABLE COPY

United States Statutory Invention Registration [19]

[11] Reg. Number: H394

Cleaton [43] Published: Dec. 1, 1987

[54] FLEXIBLE COUPLING DEVICE WITH ELECTRICAL BONDING FOR METALLIC DUCTS

[75] Inventor: Neil J. Cleaton, St. Charles, Mo.

[73] Assignee: The United States of America as represented by the Secretary of the Navy, Washington, D.C.

[21] Appl. No.: 68,000

[22] Filed: Jun. 12, 1987

[51] Int. Cl.[4] ..... H05F 3/02; F16L 11/12

[52] U.S. Cl. ..... 361/215; 174/47

[56] References Cited

U.S. PATENT DOCUMENTS

| | | | |
|---|---|---|---|
| 2,036,414 | 4/1936 | Jore | 174/73 R |
| 3,166,688 | 1/1965 | Rowand et al. | 174/68 C |
| 3,457,359 | 7/1969 | Soucy | 174/47 |
| 3,555,170 | 1/1971 | Petzetakis et al. | 174/47 |
| 3,860,742 | 1/1975 | Medney | 174/84 S |

*Primary Examiner*—Stephen C. Buczinski
*Assistant Examiner*—Linda J. Wallace
*Attorney, Agent, or Firm*—William C. Townsend; Harvey A. David

[57] ABSTRACT

A flexible fluid coupling and electrical bonding device includes a sleeve of elastomeric material and a wire mesh bonding strip having its central portion embedded between layers of the sleeve wall laminations, with extra length portions of the strip folded back within the sleeve either against or embedded in the inner surface of the sleeve so as to be clamped against and effect electrical bonding between metallic duct ends when joined by the device.

4 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLEXIBLE COUPLING DEVICE WITH ELECTRICAL BONDING FOR METALLIC DUCTS

BACKGROUND OF THE INVENTION

This invention relates to the field of coupling of fluid ducts in aircraft and more particularly to electrical bonding across metallic duct connections to protect against possible dangerous static charge build-up.

Heretofore, electrical bonding between metallic duct sections, for example aluminum ducts used in place of non-metallic ducting in aircraft, have required use of special couplings, bonding strips, or jumper wires in addition to rubber cuff couplings for carrying the desired fluid flow between duct sections or to points of connection.

SUMMARY OF THE INVENTION

With the foregoing in mind, it is a principal asset of the invention to provide a rubber cuff ducting coupling having an integral electrical bonding conductor provided therewith so that electrical bonding is provided at the same time that flow coupling is established.

As another object the invention aims to provide for combined fluid flow and electrical continuity between metal duct sections.

Still another object is to accomplish the foregoing through the provision of a flexible rubber or other elastomer cuff or coupling in the form of a tubular sleeve and having a wire mesh strip molded into the sleeve and operative to make the desired electrical coupling upon installation. In one embodiment the wire mesh strip has extra lengths beyond the ends thereof, the extra lengths of the mesh strip being folded against the inside of the sleeve so as to be clamped against the duct upon installation, while in another embodiment the folded back extra lengths are embeded in the sleeve wall to avoid need for use of sealant during installation.

Other objects and many of the attendant advantages will be readily appreciated as the subject invention becomes better understood by reference to the following detailed description, when considered in conjunction with the accompanying drawing.

DESCRIPTION OF THE PREFERRED EMBODIMENT

Figure 1:
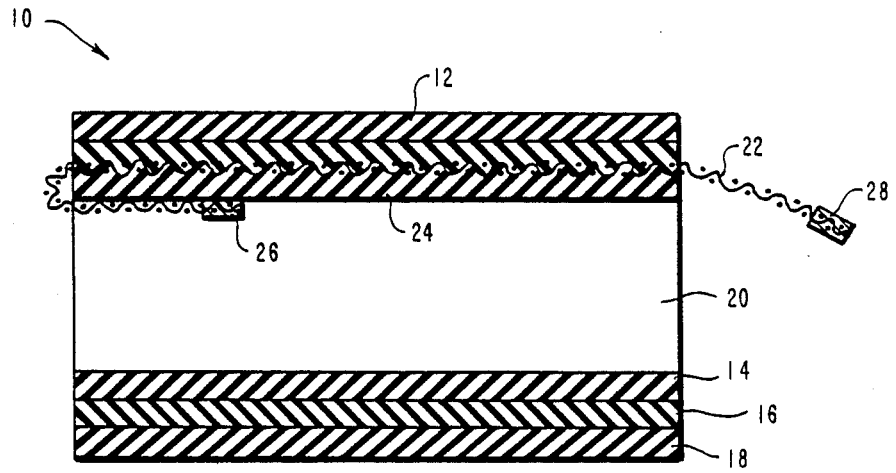
FIG. 1 is a longitudinal sectional view of a rubber cuff duct coupling embodying the present invention.

In the form of the invention illustrated in FIG. 1, a flexible cuff type of duct coupling device is generally indicated at 10 and comprises an elastomeric cylindrical sleeve 12. The wall of the sleeve 12 is formed, in this example, of layers 14, 16 and 18 of fiberglass reinforced silicone rubber material laminated and cured into an integral unit defining a central bore or lumen 20. Disposed or embedded between the innermost layer 12 and the second layer 14 is an electrically conductive wire mesh strip 22, the strip 22 being of greater length than the sleeve 12. The extra portion of the strip 22 at each end is adapted to be turned inwardly of the lumen 20 of the sleeve against the inner surface 24 thereof. Thus, the extra length portion at the left end of the strip 22, as viewed in the FIG. 1, is illustrated in the in-turned position, while the extra length portion at the right hand end is illustrated in an extended position.

The ends of the wire mesh are conveniently coated with solder, as shown at 26, 28, the solder coatings serving to prevent fraying and to improve electrical contact with aluminum or other metallic duct sections when joined or coupled by the device 10.

In manufacture, the inner layer 14 is conveniently formed of prepregged fiberglass with the prepreg rubber coating facing away from the bore or lumen 22, the intermediate layer 14 is formed of prepreg fiberglass coated on both sides, and the outer layer 16 is prepreg coated on the side facing toward the lumen. Of course, more or fewer layers can be used depending upon the desired thickness, flexibility, and the like appropriate to the duct system with which the cuff is to be used.

In use, the flexible coupling 10 has the extra length portions of the wire mesh strip 22 bent inwardly, and the sleeve 10 is slipped over the ends of the duct elements to be joined, rubber cement or other suitable sealing compound first being applied to the duct ends to prevent leakage past or through the wire mesh. Preferably, a single, wide clamp (not shown) is used to clamp the sleeve to the aligned ends of duct elements with the in-turned ends of strip 22 in tight electrical engagement therewith.

Figure 2:
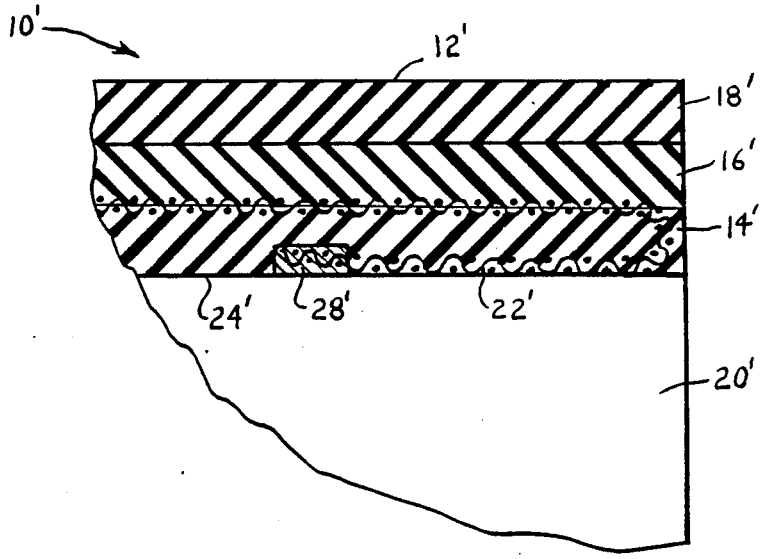
FIG. 2 is a fragmentary sectional view, on an enlarged scale, of an alternative coupling embodying the invention.

Referring now to the alternative embodiment of FIG. 2, wherein parts corresponding to parts in FIG. 1 are indicated by corresponding reference numerals with prime marks added, a coupling 10′ is shown that avoids the need for use of a sealant during installation. Thus, the folded back end portions of the mesh strip 22′ are embedded in the inner layer 14′ of the sleeve 12′ during molding of the coupling. Sufficient surfaces of the wire mesh are exposed or coextensive with the inner surface of the bore 20′ that electrical contact is made with duct ends during installation.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A fluid coupling and electrical bonding device for joining sections of metallic ducting, said device comprising:

a sleeve having a cylindrical wall formed of flexible elastomeric material, said sleeve having a predetermined length and defining a lumen for receiving ends of duct sections to be joined;

a strip of electrically conductive wire mesh, said strip being longer than said predetermined length and having its central portion embedded in said material so that extra length portions of said strip extend beyond said central portion at each end of said sleeves; and said extra length portions of said strip being adapted to be bent inwardly of said lumen for engagement with the duct ends when joined by said device.

2. A device as defined in claim 1, and wherein:

said sleeve wall comprises a plurality of layers of fiberglass reinforced rubber with said central portion of said strip disposed between at least two of said layers.

3. A device as claimed in claim 2, and further comprising soldering areas of said extra length end portions.

4. A fluid coupling and electrical bonding device for joining sections of metallic ducting, said device comprising:

a sleeve having a wall formed of a plurality of layers of flexible elastomeric material, said sleeve having a predetermined length and defining a lumen for receiving ends of duct sections to be joined;

a strip of electrically conductive wire mesh, said strip having a central portion laminated between two of said layers and having end portions doubled back and embedded in an innermost one of said layers such that surfaces of said end portions of said mesh are coextensive with and exposed through the surface of said layer facing said lumen, whereby said wire mesh will make electrical contact with said duct when said sleeve is clamped in fluid-tight relation thereto.

* * * * *